UNITED STATES PATENT OFFICE.

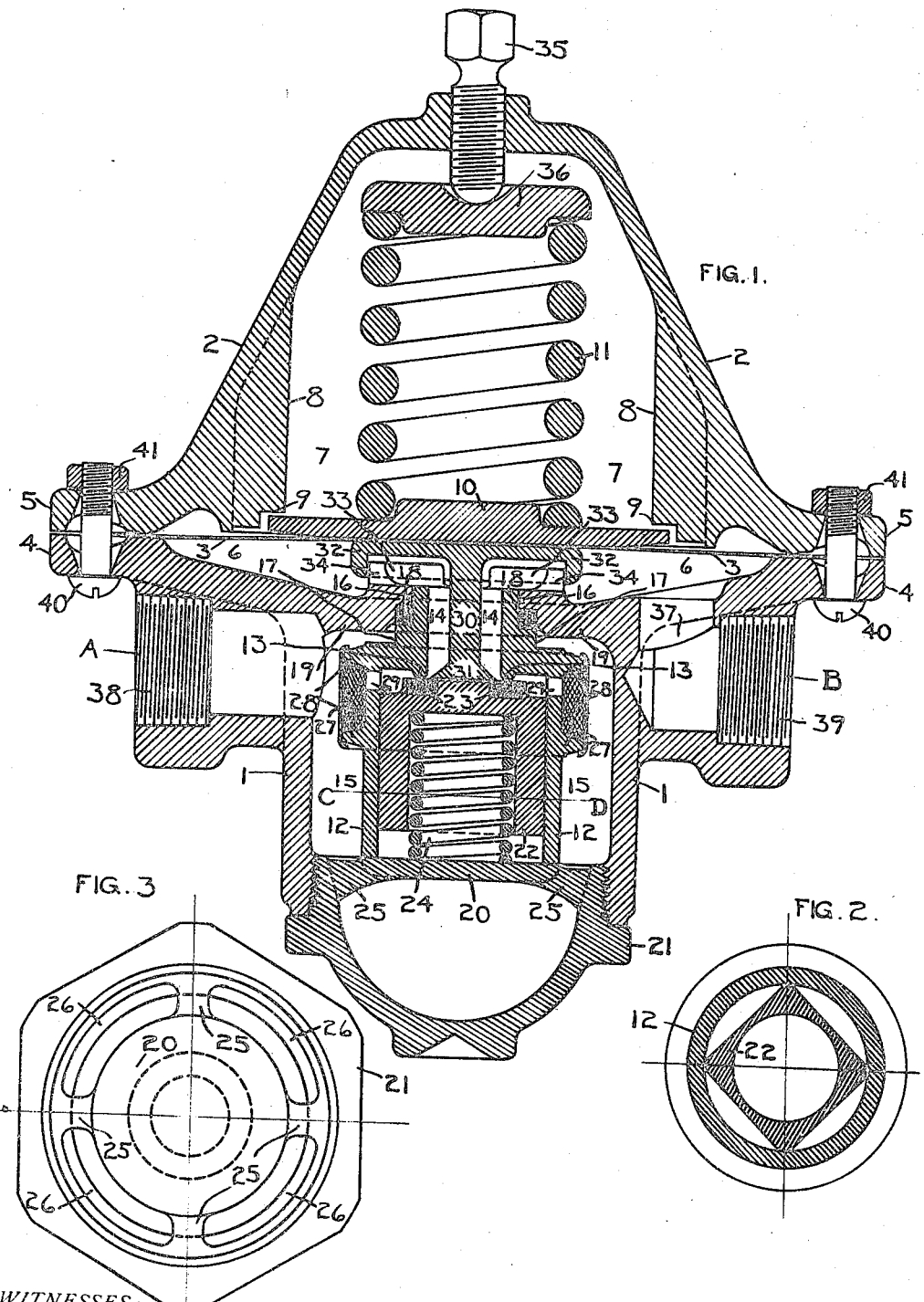

ARTHUR W. CASH, OF DECATUR, ILLINOIS.

PRESSURE REDUCING AND REGULATING VALVE.

1,190,514.        Specification of Letters Patent.     Patented July 11, 1916.

Application filed December 17, 1915. Serial No. 67,421.

*To all whom it may concern:*

Be it known that I, ARTHUR W. CASH, a citizen of the United States, residing in Decatur, in the county of Macon and State of Illinois, have invented certain new and useful Improvements in Pressure Reducing and Regulating Valves, of which the following is a specification.

My invention relates to that class of pressure reducing and regulating valves commonly known as diaphragm operated, and has for its object to provide a device in which the fluid pressure to be reduced and regulated, is caused to flow through a seat opening, or restricted portion where it may be stopped or controlled by a movable seat disk, the seat disk being controlled initially by the diaphragm, and secondarily by the high or initial pressure in such manner that the excess initial pressure is utilized to help close the valve seat disk when only a very small volume, or no volume is being used from the reduced, or outlet side of the regulating valve.

Another object of my invention is to provide a reducing and regulating valve of such construction, that the valve opening or seat, and the seat disk, may be readily, and inexpensively replaced or renewed when worn by service as it is well known, that these parts of all fluid pressure reducing and regulating valves quickly become worn away in many kinds of service.

A further object of this invention, is to provide a pressure reducing and regulating valve having a self contained screen, whereby the valve seat, and seat disk, may be effectually protected from obstruction and abrasure by particles of foreign matter such as scale, metal cuttings, grit, &c., which is very commonly found in the pipes or conduits on which such regulating valves are installed.

To effectually accomplish the objects stated, I have provided a construction in which the controlling valve disk though initially controlled, or operated by the diaphragm, is not mechanically connected thereto for the purpose of facilitating removal and renewal, as well as for other objects referred to later, and with this further object in view, the valve seat, and the guiding portion for the valve proper integral therewith, is of such construction, that it is held in impervious contact with the dividing wall between the inlet and outlet portions of the valve without being mechanically connected thereto.

The construction further provides very essential space surrounding and below the controlling valve seat, and seat disk, for the reception of any and all foreign matter that may be intercepted by the screen, as well as means for the removal of the foreign matter, and means for the removal, or renewal of the screen when it has become worn or clogged beyond an effective stage.

The several objects stated are accomplished by the construction and mechanism shown in the accompanying drawing, in which—

Figure 1, is a central elevation in section showing the construction of the upper, and lower casing portions, and all of the several operating parts. Fig. 2, is a section on line C, D, of the slidably mounted valve proper, and the cylindrical guiding portion of the valve seat. Fig. 3, is a plan view of a screw threaded cap which abuts the lower end of the cylindrical guiding portion of the valve seat casing, holding the upper end in impervious contact with the dividing wall between the inlet and outlet chambered portions of the lower body casing, this cap serving further to confine the slidably mounted valve, and the spring which tends to close the valve disk against the valve seat, and the cap further serves as a receptacle for foreign matter, in addition to closing the lower end of the chambered lower body portion.

Similar reference letters and numerals refer to corresponding parts throughout the several views.

The valve body casing is composed of a lower chambered portion 1, and an upper chambered portion 2, preferably circular in plan form, the two chambered portions being separated by a diaphragm 3, which is tightly held between the flange 4, of the lower casing 1, and the flange 5, on the upper casing 2, imperviously separating the lower chamber 6, from the upper chamber 7.

The upper casing 2, contains a plurality of guiding ribs 8, with the limit stops 9, at their lower extremities, to guide and limit the movement of the pressure plate 10, through which, the energy stored in the compressed spring 11, is transmitted to the diaphragm 3 to force the latter downward against the fluid pressure in the chamber 6.

The valve piston cylinder 12 which may be square in section as shown in Fig. 2, is provided with an integral seating portion 13, circular in form, and surrounding the passage way 14, through which the fluid must flow in passing from the chamber 15, into the chamber 6, and thence to the outlet connection at B.

The upper part of valve piston cylinder 12, is formed with a reduced neck portion 16, and a larger shouldered portion 17, against which shoulder, and surrounding the neck 16, is provided a packing ring 18, of any suitable resilient, and compressible material adapted to form an impervious joint between the valve piston cylinder 12, and the dividing wall 19, between the chamber 15, and chamber 6, in the casing portion 1.

The lower end of cylinder 12, abuts the circular central portion 20, of screw threaded cap 21, through which means it is held in impervious connection with dividing wall 19, the central portion 20, of cap 21, also serving to retain valve piston 22, whose seat disk 23, is normally held against seat 13, by means of the compressed spring 24.

The central circular shaped portion 20, of cap 21, is formed integral with the latter through ribs 25, the intervening ports 26, providing passage ways for the sediment or foreign matter intercepted by screen 27, which is cylindrical in form, and is held in surrounding position to cylinder 12, by the annular ribs 28.

A plurality of circumferentially distributed ports 29, preferably restricted in area, provide passage for the fluid from chamber 15, into cylinder 12, these ports being protected against obstruction from foreign matter by the screen 27, which also serves to protect seat 13, and seat disk 23.

A pusher post 30, with an enlarged beveled end 31, is centrally disposed in passage way 14, the upper end of which post is terminated in the enlarged cup shaped head 32, the inner side of which fits loosely over, and is centrally guided by the circular disposed guides 33, which are preferably formed integral with the lower body casing 1, a plurality of passage ways 34, permitting the flow of fluid into the chamber 6, and thence into the outlet connection at B. Pusher post 30, abuts the under side of diaphragm 3, and the upper end of valve piston 22, and its seat disk 23, and is of such length, that when diaphragm 3, is near its upper limit, the seat disk 23 will be in closed position against seat 13, and when diaphragm 3, is in a lower position, as from the outlet of fluid, or reduction of the pressure in the chamber 6, seat disk 23, will be away from seat 13.

Adjusting screw 35, and spring cap 36, provide the usual means for compressing the spring 11, thereby storing sufficient energy to balance the pre-determined amount of reduced, or delivery pressure required in chamber 6, and its outlet connection at B.

It may be seen from the drawings, and the foregoing description, that whenever the valve disk 23, is in closed position against seat 13, that the initial, or high pressure entering from the connection at A and through the restricted ports 29 to the bottom of cylinder 12, will aid spring 24, in holding piston 22, and seat disk 23, in closed position, also it may be seen, that when a large volume is being drawn from the outlet at B, that the pressure in chamber 6, will be reduced correspondingly, and diaphragm 3, will be forced downward thereby acting through pusher post 30, to force valve piston 22, and its seat disk 23, down a sufficient distance until the area of seat opening may be greater than the combined areas of the restricted ports 29, at which times, the pressure within the piston cylinder 12, will by reason of the restricted ports 29, be somewhat less than the initial pressure within the inlet connection at A, and the chamber 15, and the lessened pressure in cylinder 12 will thereby offer less resistance to the opening of valve piston 22, and seat disk 23, in its effort to restore the reduced delivery pressure in chamber 6, and the outlet connection therefrom thereby maintaining a more uniform delivery pressure.

Internal threads 38, at inlet A, and 39, at outlet A, form the usual means for connecting the valve to the pipe or conduit, and bolts 40, with their nuts 41, form the usual means for holding the lower casing 1, and upper casing 2, in impervious contact with diaphragm 3, which is of any suitable resilient material.

In normal manner of operation, starting with no fluid pressure in the connecting pipe at B, if fluid under pressure be admitted at A, it will flow through screen 27, restricted ports 29, and valve disk 23, being away from seat 13, the flow will continue on through the central passageway 14, and out through passage ways 34, under the enlarged head 32, of pusher post 30, the enlarged head 32 serving to deflect the fluid flow to prevent it impinging on and rapidly wearing away diaphragm 3. After the fluid has entered and filled the outlet chamber 6, it passes downward through passageway 37, into the connecting pipe at B, and when the pressure of the fluid within the outlet connection at B, and in the chamber 6, has reached the predetermined point, it causes diaphragm 3, to move upward, and pusher post 30, following the diaphragm 3, allows valve piston 22, and seat disk 23, under action of compressed spring 24, aided by the higher initial pressure, to close, or partially close against seat 13, thereby stopping, or partially stopping the flow of fluid until such time as the pressure within the chamber 6, is diminished below the predetermined point.

I am aware that some of the several parts shown and described in these specifications are old and well known, having been disclosed in several patents already issued, and also shown and described in a certain prior application filed by myself, which application bears the Serial No. 39703 filed July 13, 1915, but

I claim new and useful combination of some of the said several parts as follows:

1. In a pressure reducing and regulating valve, the combination of upper and lower casing portions, a diaphragm adapted to be held by and form an impervious division between said casing portions, inlet and outlet chambers within said lower casing portion, a dividing wall having a port therethrough between said inlet and outlet chambers, a valve piston cylinder having an integral seat therein, a slidably mounted valve within said piston cylinder adapted to imperviously close against said integral seat, a spring tending to press said valve to a closed position against said seat, a plurality of restricted ports through the wall of said piston cylinder communicating with said inlet chamber, in combination with compressible and resilient packing means adapted to form an impervious joint between the outside of the seat end of said valve piston cylinder and said dividing wall surrounding the port therethrough, means abutting and closing the end of said piston cylinder away from its seat end said means also serving to confine said slidably mounted valve and the spring in said valve piston cylinder, said abutting means further serving to hold said valve piston cylinder within said inlet chamber with the outside of the seat end of said piston cylinder in impervious contact with said dividing wall surrounding the port therethrough.

2. In a pressure reducing and regulating valve, the combination of upper and lower casing portions, a diaphragm adapted to be held by and form an impervious division between said casing portions, inlet and outlet chambers within said lower casing portion, a dividing wall having a port therethrough between said inlet and outlet chambers, a valve piston cylinder having an integral seat therein, a slidably mounted valve within said piston cylinder adapted to imperviously close against said integral seat, a spring tending to press said slidably mounted valve to a closed position against said seat, a plurality of restricted ports through the wall of said piston cylinder communicating with said inlet chamber, compressible and resilient packing means adapted to form an impervious joint between the outside of the seat end of said valve piston cylinder and said dividing wall surrounding the port therethrough, means abutting and closing the end of said piston cylinder away from its seat end said means also serving to confine said slidably mounted valve and the spring in said valve piston cylinder, said abutting means further serving to hold said valve piston cylinder within said inlet chamber with the outside of the seat end in impervious contact with said dividing wall surrounding the port therethrough, means abutting said slidably mounted valve and the said diaphragm separating said upper and lower casing portions, an enlarged deflecting portion on said abutting means adjacent said diaphragm, together with adjustable means in said upper casing portion adapted to load said diaphragm whereby the downward movement of said diaphragm will cause said slidably mounted valve to open away from said integral seat in said valve piston cylinder.

3. In a pressure reducing and regulating valve, the combination of upper and lower casing portions imperviously separated by a diaphragm, inlet and outlet chambers in said lower casing portion, a dividing wall having a port therethrough separating said inlet and outlet chambers, a valve piston cylinder having an integral seat therein contained within said inlet chamber, the outside of the seat end of said valve piston cylinder adapted to be held in impervious contact with the dividing wall surrounding the communicating port between the said inlet and outlet chambers, a slidably mounted valve within said valve piston cylinder, a spring normally closing said valve against said integral seat in the direction of fluid flow, means for closing the end of said valve piston cylinder away from its seat end, restricted ports through the wall of said valve piston cylinder whereby the full initial fluid pressure will be within the cylinder when only a small volume of fluid is flowing, and a partially reduced initial pressure will be within the cylinder when a large volume of fluid is flowing.

4. In a pressure reducing and regulating valve, the combination of upper and lower casing portions imperviously separated by a diaphragm inlet and outlet chambers in said lower casing portion, a dividing wall having a port therethrough separating said inlet and outlet chambers a valve piston cylinder having an integral seat therein contained within said inlet chamber, the outside seat end of said valve piston cylinder adapted to be held in impervious contact through intermediate compressible and resilient packing means, with the dividing wall surrounding the port therethrough, a slidably mounted valve within said valve piston cylinder, a spring normally closing said valve against said integral seat in the direction of the fluid flow, means for closing the end of said valve piston cylinder away from its seat end, restricted ports through the wall of said valve piston cylinder whereby the full initial fluid pressure will be within the cylinder when only a small volume of fluid is flowing, and a partially reduced initial pressure will be within the cylinder when a large volume of fluid is flowing, a screen surrounding the outer wall of said valve piston cylinder and supported thereby through the intermediary means of ribs so disposed as to hold the screen from immediate contact with said cylinder wall, whereby the screen may intercept and deflect any foreign matter within the fluid, to prevent obstruction of the restricted ports, and obstruction to the closing of the said slidably mounted valve within said valve piston cylinder.

5. In a pressure reducing and regulating valve, the combination of upper and lower casing portions, a diaphragm imperviously separating said casing portions, inlet and outlet chambers in said lower casing portion, a dividing wall with a port therethrough between said inlet and outlet chambers, a valve cylinder providing therein a valve seat and a valve adapted to close with the fluid flow against said seat, means adapted to close the end of said valve cylinder and confining the said valve therein, together with restricted ports through the wall of said valve cylinder, a screen surrounding said valve cylinder wall and supported thereby adapted to prevent the passage of foreign matter to and through said restricted ports, and said valve cylinder adapted to be contained within said inlet chamber with the outside of the valve seat end of said valve cylinder in removable impervious contact with said dividing wall surrounding the port therein, together with an extended portion of said inlet chamber adapted to receive and hold foreign matter intercepted and deflected by said screen.

ARTHUR W. CASH.

Witnesses:
G. L. MOORE,
ELMER F. LEMMON.